(12) United States Patent
Drukier et al.

(10) Patent No.: US 11,428,832 B2
(45) Date of Patent: Aug. 30, 2022

(54) CROWD-SOURCED HARDWARE CALIBRATION

(71) Applicant: IMAGE INSIGHT INC., East Hartford, CT (US)

(72) Inventors: Gordon A. Drukier, New Haven, CT (US); Eric P. Rubenstein, Longmeadow, MA (US); Yonatan B. Rubenstein, Longmeadow, MA (US); Joshua C. Kessler, East Longmeadow, MA (US); Peter R. Solomon, West Hartford, CT (US); Marek A. Wojtowicz, East Hartford, CT (US)

(73) Assignee: IMAGE INSIGHT, INC., East Hartford, CT (US)

( * ) Notice: Subject to any disclaimer, the term of this patent is extended or adjusted under 35 U.S.C. 154(b) by 376 days.

(21) Appl. No.: 14/078,129

(22) Filed: Nov. 12, 2013

(65) Prior Publication Data
US 2014/0136135 A1    May 15, 2014

Related U.S. Application Data

(60) Provisional application No. 61/725,226, filed on Nov. 12, 2012.

(51) Int. Cl.
*G01T 7/00*  (2006.01)
*G01T 1/02*  (2006.01)
(Continued)

(52) U.S. Cl.
CPC .............. *G01T 7/005* (2013.01); *G01T 1/02* (2013.01); *G06T 7/20* (2013.01); *G06T 7/80* (2017.01); *G06T 7/85* (2017.01); *H04N 7/18* (2013.01)

(58) Field of Classification Search
CPC ...... G01P 21/00; G01P 15/18; G01P 15/0891; G01P 21/02; G01P 3/489; G01K 15/00;
(Continued)

(56) References Cited

U.S. PATENT DOCUMENTS

| 3,864,574 A | 2/1975 | Wilhelm et al. |
| 4,255,660 A | 3/1981 | Blundell et al. |

(Continued)

FOREIGN PATENT DOCUMENTS

| CA | 2878820 A1 * | 8/2015 | ............... H04R 3/04 |
| CN | 102322946 A * | 1/2012 | |

(Continued)

OTHER PUBLICATIONS

*Electric Power Group v. Alstom* (See Attached Case).*

(Continued)

*Primary Examiner* — Arleen M Vazquez
*Assistant Examiner* — Leonard S Liang
(74) *Attorney, Agent, or Firm* — Troutman Pepper Hamilton Sanders LLP

(57) ABSTRACT

Systems and methods for calibrating multiple electronic devices are described herein. Such methods may include obtaining, by a processor, data from a plurality of reference electronic devices, analyzing, by a processor, the data and calibrating, by the processor, the electronic device based on the analyzed data obtained from the plurality of reference electronic devices.

23 Claims, 7 Drawing Sheets

(51) Int. Cl.
*G06T 7/20* (2017.01)
*G06T 7/80* (2017.01)
*H04N 7/18* (2006.01)

(58) Field of Classification Search
CPC .. G01J 5/522; G01C 9/06; G01C 9/00; G01D 3/022; G01D 18/008; G01D 3/02; G01D 5/2448; G06F 17/40; G01N 21/274; G01R 35/005; G06T 7/0018; G01L 27/00; G01L 19/04; G01T 7/005
USPC ... 702/85–86, 94, 96, 98–99, 104, 141, 154; 73/1.37
See application file for complete search history.

(56) References Cited

U.S. PATENT DOCUMENTS

| | | | |
|---|---|---|---|
| 4,476,231 A | 10/1984 | Deindoerfer et al. | |
| 4,995,396 A | 2/1991 | Inaba et al. | |
| 5,017,019 A * | 5/1991 | Pompei | G01J 5/16 374/121 |
| 5,117,114 A | 5/1992 | Street et al. | |
| 5,301,671 A | 4/1994 | Leighton et al. | |
| 5,548,123 A | 8/1996 | Perez-Mendez et al. | |
| 5,691,747 A | 11/1997 | Amano | |
| 5,742,659 A | 4/1998 | Atac et al. | |
| 5,805,466 A | 9/1998 | Roeckner et al. | |
| 6,032,107 A | 2/2000 | Hitchcock | |
| 6,254,394 B1 | 7/2001 | Draper et al. | |
| 6,448,562 B1 | 9/2002 | Seidler et al. | |
| 6,749,761 B1 | 6/2004 | Andreaco et al. | |
| 7,130,375 B1 | 10/2006 | Yun et al. | |
| 7,151,447 B1 | 12/2006 | Willms et al. | |
| 7,391,028 B1 | 6/2008 | Rubenstein | |
| 7,441,953 B2 | 10/2008 | Banks | |
| 7,737,410 B2 | 6/2010 | Rubenstein | |
| 7,834,320 B2 | 11/2010 | Goldberg et al. | |
| 7,855,375 B2 | 12/2010 | Kearfott | |
| 7,994,926 B2 | 8/2011 | Longman et al. | |
| 8,158,950 B2 | 4/2012 | Rubenstein | |
| 8,248,467 B1 * | 8/2012 | Ganick | H04W 4/029 348/116 |
| 8,324,589 B2 | 12/2012 | Rubenstein | |
| 8,334,898 B1 * | 12/2012 | Ryan | G01C 21/206 348/61 |
| RE44,536 E | 10/2013 | Kishkovich et al. | |
| 8,563,937 B2 | 10/2013 | Rubenstein | |
| 8,870,779 B2 | 10/2014 | Altmann et al. | |
| 9,000,386 B2 | 4/2015 | Rubenstein | |
| 9,078,102 B2 * | 7/2015 | Edge | H04W 4/028 |
| 9,090,967 B1 | 7/2015 | Nagarkar et al. | |
| 9,683,865 B2 * | 6/2017 | Keal | G01C 25/005 |
| 2002/0080132 A1 * | 6/2002 | Dai | G06F 1/3203 345/212 |
| 2003/0012252 A1 * | 1/2003 | Bender | G01J 1/4257 374/32 |
| 2003/0043967 A1 * | 3/2003 | Aufrichtig | A61B 6/5258 378/207 |
| 2003/0085870 A1 * | 5/2003 | Hinckley | G06F 1/1626 345/156 |
| 2003/0227383 A1 | 12/2003 | Berry | |
| 2004/0002843 A1 | 1/2004 | Robarts et al. | |
| 2004/0070227 A1 | 4/2004 | Pape et al. | |
| 2004/0094720 A1 | 5/2004 | Dagan et al. | |
| 2004/0149918 A1 | 8/2004 | Craig et al. | |
| 2004/0178339 A1 | 9/2004 | Gentile et al. | |
| 2005/0046430 A1 | 3/2005 | Kinnunen et al. | |
| 2005/0054374 A1 | 3/2005 | Namiki | |
| 2005/0181810 A1 * | 8/2005 | Camp, Jr. | G01C 21/10 455/456.6 |
| 2005/0265516 A1 | 12/2005 | Haider | |
| 2006/0097171 A1 | 5/2006 | Balchunas et al. | |
| 2006/0169905 A1 | 8/2006 | Wendstrand | |
| 2007/0149883 A1 | 6/2007 | Yesha | |
| 2008/0001090 A1 | 1/2008 | Ben-Haim et al. | |
| 2008/0108340 A1 * | 5/2008 | Karstens | H04M 1/72569 455/418 |
| 2008/0234935 A1 * | 9/2008 | Wolf | G01C 21/16 701/472 |
| 2009/0058663 A1 | 3/2009 | Joshi et al. | |
| 2009/0114830 A1 | 5/2009 | Rubenstein | |
| 2009/0135002 A1 | 5/2009 | Blinnikka | G08B 13/1427 340/539.13 |
| 2009/0264114 A1 * | 10/2009 | Virolainen | H04M 3/56 455/416 |
| 2010/0210290 A1 | 8/2010 | Riley et al. | |
| 2010/0214090 A1 | 8/2010 | Sartini et al. | |
| 2010/0245107 A1 | 9/2010 | Fulker et al. | |
| 2010/0282847 A1 * | 11/2010 | Lei | G06K 7/10792 235/438 |
| 2010/0286467 A1 * | 11/2010 | Pesach | A61M 5/158 600/9 |
| 2010/0318641 A1 | 12/2010 | Bullard et al. | |
| 2011/0090123 A1 * | 4/2011 | Sridhara | G01S 5/0252 342/450 |
| 2011/0307222 A1 | 12/2011 | Rubenstein | |
| 2012/0010812 A1 * | 1/2012 | Thompson | G01C 21/16 701/501 |
| 2012/0024044 A1 | 2/2012 | Tao et al. | |
| 2012/0052883 A1 * | 3/2012 | Austin | G01S 5/0063 455/456.6 |
| 2012/0077544 A1 | 3/2012 | Rubenstein | |
| 2012/0139554 A1 * | 6/2012 | Parsons | G01R 35/04 324/543 |
| 2012/0212319 A1 * | 8/2012 | Ling | G06F 1/3203 340/3.1 |
| 2012/0226460 A1 | 9/2012 | Fiennes et al. | |
| 2012/0255875 A1 * | 10/2012 | Vicente | A61B 5/002 205/782 |
| 2012/0256762 A1 | 10/2012 | Greenberger | |
| 2012/0281096 A1 | 11/2012 | Gellaboina et al. | |
| 2013/0179075 A1 * | 7/2013 | Haverinen | G01C 21/08 701/525 |
| 2013/0197845 A1 * | 8/2013 | Keal | G01P 21/00 702/96 |
| 2013/0274954 A1 * | 10/2013 | Jordan, Jr. | G06F 17/00 701/1 |
| 2013/0293416 A1 * | 11/2013 | Waters | G01S 19/48 342/357.31 |
| 2013/0293591 A1 * | 11/2013 | Miller | G03B 21/2033 345/690 |
| 2013/0306840 A1 * | 11/2013 | Kaletsch | G01T 7/00 250/208.1 |
| 2013/0320964 A1 * | 12/2013 | Oliver | G01R 33/0035 324/202 |
| 2013/0342851 A1 | 12/2013 | Dresel et al. | |
| 2014/0011518 A1 * | 1/2014 | Valaee | H04W 4/33 455/456.1 |
| 2014/0135040 A1 * | 5/2014 | Edge | H04W 4/025 455/456.6 |
| 2014/0224964 A1 | 8/2014 | Solomon et al. | |
| 2014/0278144 A1 * | 9/2014 | Risk | G01D 18/008 702/24 |
| 2014/0278186 A1 * | 9/2014 | Herzl | G01N 33/0006 702/104 |
| 2014/0288820 A1 * | 9/2014 | Opshaug | G01C 21/30 701/412 |
| 2014/0323157 A1 | 10/2014 | Drukier et al. | |
| 2016/0049819 A1 | 2/2016 | Butler et al. | |

FOREIGN PATENT DOCUMENTS

| | | |
|---|---|---|
| EP | 2700977 A1 | 2/2014 |
| EP | 1891463 B1 | 7/2014 |
| GB | 1038042 A | 8/1966 |
| GB | 2265753 A | 10/1993 |
| GB | 2400480 A | 10/2004 |
| JP | H02-174838 A | 7/1990 |
| JP | H7(1995)-311271 | 11/1995 |
| JP | 2000-329855 | 11/2000 |
| JP | 2005-512064 A | 4/2005 |

(56) References Cited

FOREIGN PATENT DOCUMENTS

| JP | 2005-534898 A | 11/2005 | |
|---|---|---|---|
| JP | 2007317182 A * | 12/2007 | ......... G05B 19/4184 |
| JP | 2014202553 A | 10/2014 | |
| WO | WO 1995/014245 A | 5/1995 | |
| WO | WO-0195642 A2 * | 12/2001 | ............ H04W 64/00 |
| WO | WO 2002/063339 A1 | 8/2002 | |
| WO | 2012141894 A1 | 10/2012 | |
| WO | WO 2013/060347 A1 | 5/2013 | |

OTHER PUBLICATIONS

Wikipedia Entry for Photodiode (Year: 2012).*
Machine Translation for JP2007317182 (Year: 2007).*
Wikipedia Entry for Photoelectric sensor (Year: 2011).*
Google English Abstract for CN102322946A (Year: 2012).*
Aquino, "Smile, You're on Cell Phone Camera!", PC World (Jan. 9, 2003) downloaded Feb. 1, 2012 from http://www.pcworld.com/article/108198/smile_youre_on_cell_phone_camera.html.
Bigelow, "Homeland Security Backs Cell Phone Sensors to "Crowdsource" Detection of Deadly Chemicals," available online Nov. 2, 2009 from http://www.xconomy.com/san-diego/2009/11/02/homeland-security-backs-cell-phone-sensors-to-%E2%80%9Ccrowdsource%E2%80%9D-detection-of-deadly-chemicals/.
Chugg et al., "A CCD Miniature Radiation Monitor", *IEEE Transactions on Nuclear Science*, Jun. 2002, 49(3):1327-1332.
Clayton et al., Figaro for IRAF, www.starlink.rl.ac.uk/Bulletin/97sep/a16.html, printed from internet, Jun. 6, 2006.
FAS Public Interest Report vol. 55, No. 2, Mar.-Apr. 2002.
International Search Report and Written Opinion for PCT/US2006/006914 dated Jun. 7, 2007.
International Search Report and Written Opinion for PCT/US2014/015543 dated May 14, 2014.
International Search Report and Written Opinion for PCT/US2014/035480 dated Sep. 25, 2014.
NASA Award Announcement, "Ames Honored with Invention Award for Chemical Detection Sensor," available online Apr. 10, 2013 from http://www.nasa.gov/centers/ames/news/2013/13-026AR_nasa-gov-invention-of-the-year.html.
Nieminen et al., "ESA's Space Radiation and Plasma Monitoring Programmes", *WRMISS Workshop*, Nov. 4, 1999, PowerPoint slides, 13 pp., http://wrmiss.org/workshops/fourth/nieminen.pdf.
RadiaDroid—Simulated Radiation Detection in SmartPhones, http://liu.diva-portal.org/smash/record.jsf?pid=diva2%3A512073&dswid=1043, dated Apr. 4, 2012 (accessed Nov. 5, 2014).
RadiaDroid—Android Apps on Google Play, https://play.google.com/store/apps/details?id=com.RadiaDroid0hl=en, dated Aug. 17, 2011 (accessed Nov. 5, 2014).
Sharp et al., "Radiation Tolerance of Current CCD-based CCTV Cameras," *Proc. RADECS'95* (Third European Conference on Radiation and its Effects on Components and Systems, Aracheon, France, Sep. 18-22, 1995), pp. 249-252.
Shortridge et al., BCLEAN-Automatic Removal of Bad Lines & Cosmic Rays from CCD data, www.starlink.rl.ac.uk/star/docs/sun86.htx/node325.html, printed from internet, Jun. 6, 2006.
Shortridge et al., FIGARO—A General Data Reduction System Version 5.6-1 User's Guide www.starlink.rl.ac.uk/star/docs/sun86.htx/sun86.html, printed from internet, Jun. 6, 2006.
US Department of Homeland Security, "Privacy Impact Assessment for the Cell All Demonstration," Mar. 2, 2011, available online from http://www.dhs.gov/xlibrary/assets/privacy/privacy_pia_s&t_cell_all.pdf.
International Search Report for PCT/US2013/069706 dated Apr. 14, 2014.
Carullo et al., "A GPS-Synchronized Traveling Standard for the Calibration of Distributed Measuring Systems" IMTC 2005—Instrumentation and Measurement Technology Conference, Ottawa, CA, May 17-19, 2005.
Supplementary Partial European Search Report for EP13852440 dated Jun. 7, 2016.
International Search Report and Written Opinion for PCT/US2017/031792 dated Sep. 21, 2017.

* cited by examiner

CROWD-SOURCED HARDWARE CALIBRATION

CROSS-REFERENCE TO RELATED APPLICATIONS

This application claims the priority benefit of U.S. Provisional Patent Application No. 61/725,226, filed Nov. 12, 2012, entitled "Crowd-Sourced Hardware Calibration", which is incorporated herein by reference in its entirety.

GOVERNMENT INTEREST

The United States government may have certain rights to this invention pursuant to Contract No. D11PC20013 from DARPA (Defense Advanced Research Projects Agency).

BACKGROUND

The proliferation of electronic devices including, for example, smartphones, laptop and tablet computers, and the like, with built in hardware features, such as sensors and the like, has resulted in the development of a large number of new applications that are designed to address the needs of users by taking advantage of these hardware features. For example, one such hardware feature that has seen much development is an image sensor associated with integrated cameras. Certain applications are capable of using the image sensor to complete both imaging and non-imaging tasks, including, but not limited to, sensing radiation such as gamma radiation, and the like. For these applications to effectively function, it is important that the various hardware features be properly calibrated for these purposes. Because of the large variety of electronic devices and their corresponding hardware features, it has become increasingly difficult to properly calibrate these devices by direct investigation of each and every model and model variant.

SUMMARY

In an embodiment, a method for calibrating an electronic device may include obtaining, by a processor, data from a plurality of reference electronic devices, analyzing, by a processor, the data and calibrating, by the processor, the electronic device based on the analyzed data obtained from the plurality of reference electronic devices.

In another embodiment, a system for calibrating an electronic device may include a processor and a non-transitory, processor-readable storage medium in communication with the processor. The non-transitory, processor-readable storage medium may contain one or more programming instructions that, when executed, cause the processor to obtain data from a plurality of reference electronic devices, analyze the data and calibrate the electronic device based on the analyzed data obtained from the plurality of reference electronic devices.

DETAILED DESCRIPTION

Figure 1:
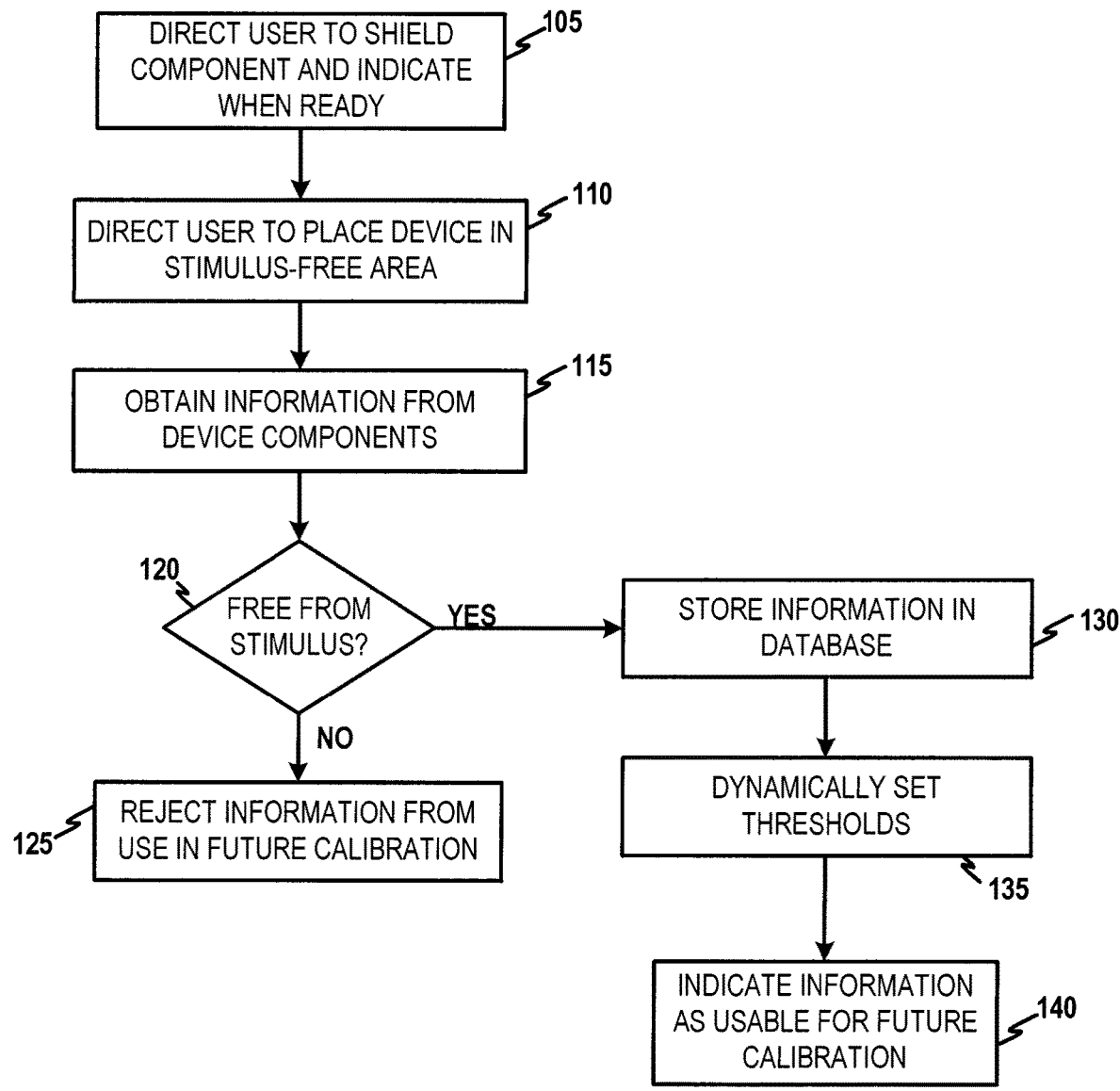
FIG. 1 depicts a flow diagram of a method of performing a quality assurance initialization process on an electronic device and/or one or more components thereof according to an embodiment.

In the following detailed description, reference is made to the accompanying drawings, which form a part hereof. In the drawings, similar symbols typically identify similar components, unless context dictates otherwise. The illustrative embodiments described in the detailed description, drawings, and claims are not meant to be limiting. Other embodiments may be utilized, and other changes may be made, without departing from the spirit or scope of the subject matter presented herein. It will be readily understood that the aspects of the present disclosure, as generally described herein, and illustrated in the Figures, can be arranged, substituted, combined, separated, and designed in a wide variety of different configurations, all of which are explicitly contemplated herein.

This disclosure is not limited to the particular systems, devices and methods described, as these may vary. The terminology used in the description is for the purpose of describing the particular versions or embodiments only, and is not intended to limit the scope.

As used in this document, the singular forms "a," "an," and "the" include plural references unless the context clearly dictates otherwise. Unless defined otherwise, all technical and scientific terms used herein have the same meanings as commonly understood by one of ordinary skill in the art. Nothing in this disclosure is to be construed as an admission that the embodiments described in this disclosure are not entitled to antedate such disclosure by virtue of prior invention. As used in this document, the term "comprising" means "including, but not limited to."

The following terms shall have, for the purposes of this application, the respective meanings set forth below.

An "electronic device" refers to a device, such as, for example, a mobile device, a computing device, a server and one or more components thereof that may be in need of one or more calibrations to ensure accurate function. In some embodiments, the electronic device includes a processor and a tangible, computer-readable memory. The memory may contain programming instructions that, when executed by the processor, cause the device to perform one or more operations according to the programming instructions.

A "mobile device" refers to an electronic device that is generally portable in size and nature. Accordingly, a user may transport a mobile device with relative ease. Examples of mobile devices include, but are not limited to, pagers, cellular phones, feature phones, smartphones, personal digital assistants (PDAs), cameras, tablet computers, phone-tablet hybrid devices (e.g., "phablets"), laptop computers, netbooks, ultrabooks, global positioning satellite (GPS) navigation devices, in-dash automotive components, media players, watches, security cameras, handheld imaging devices and the like.

A "computing device" is an electronic device and/or a mobile device, such as, for example, a computer or components thereof. The computing device may generally contain a memory or other storage device for housing programming instructions, data or information regarding a plurality of applications, data or information regarding a plurality of electronic devices and the like, or combinations thereof. The programming instructions may be in the form of an application environment, as described in greater detail herein, and/or contain one or more modules, such as software modules for carrying out tasks as described in greater detail herein. The data may optionally be contained on a database, which is stored in the memory or other storage device. The data may optionally be secured by any method now known or later developed for securing data. The computing device may further be in operable communication with one or more electronic devices. The communication between the computing device and each of the one or more electronic devices may further be secured by any method now known or later developed for securing transmissions or other forms of communication.

A "server" is a computing device or component thereof that generally provides data storage capabilities for one or more computing devices. The server can be independently operable from other computing devices and may optionally be configured to store data in a database, a memory or other storage device. The server may optionally contain one or more programming instructions, such as programming instructions in the form of the operating environment, as described in greater detail herein, and/or one or more modules, such as software modules for carrying out processes as described in greater detail herein. The server may have one or more security features to ensure the security of data stored within the memory or other storage device. Examples of security features may include, but are not limited to, encryption features, authentication features, password protection features, redundant data features and/or any other security features now known or later developed. The server may optionally be in operable communication with any of the electronic devices and/or computing devices described herein and may further be secured by any method now known or later developed for securing transmissions or other forms of communication.

A "component" can be a component of an electronic device, a standalone component, an aggregation of multiple standalone components into a single, multi-component device and the like. Examples of components include, but are not limited to, an imager, a non-imaging photon detecting sensor, a thermal sensor, a pressure sensor, a magnetic sensor, a radio frequency sensor, a radio frequency transceiver, an accelerometer, a position sensor, a global positioning system transceiver, a capacitive screen controller, an electric field sensor and the like, or combinations thereof. In some embodiments, an electronic device may contain multiple components.

In instances where the component is an imager, it may generally contain a pixilated photon detector, such as a charge coupled device (CCD) imager, a complementary metal oxide semiconductor (CMOS) imager, and an imager containing silicon-germanium, germanium, silicon-on-sapphire, indium-gallium-arsenide, cadmium-mercury-telluride or gallium-arsenide substrates and the like, or combinations thereof. The imagers used in herein may be stationary or movable. Security cameras, traffic cameras, transit cameras, hand held cameras, mobile law enforcement or traffic cameras, cell phone cameras, thermal infrared cameras, and any combination of these cameras may also be used in embodiments of the invention. In certain embodiments, an imager may be able to rotate about a vertical axis, pan, rotate about a horizontal axis, tilt manually, tilt automatically or move by action of one or more motors associated with the imager.

Figure 2:
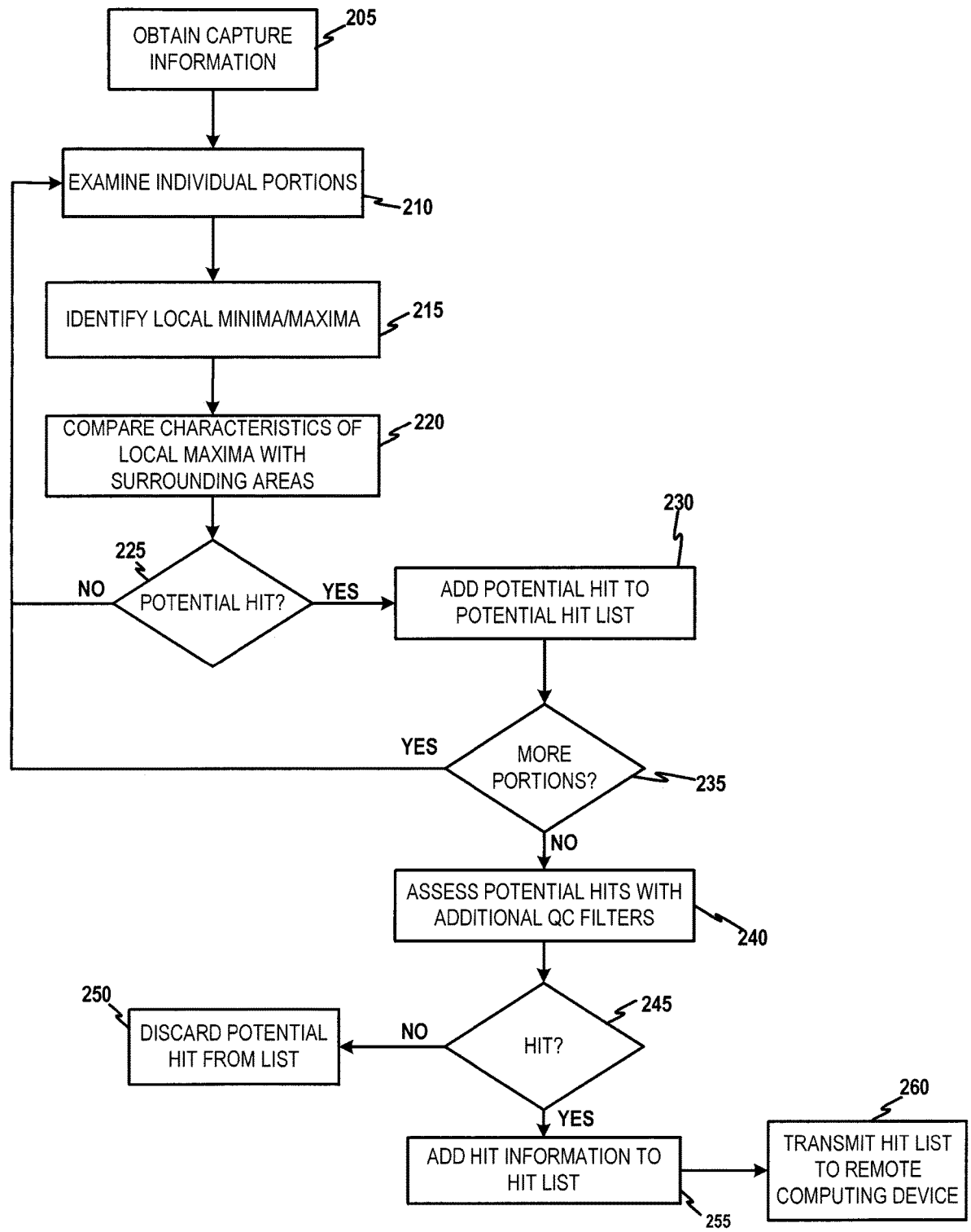
FIG. 2 depicts a flow diagram of a method for obtaining calibration measurements by an electronic device according to an embodiment.
Figure 3:
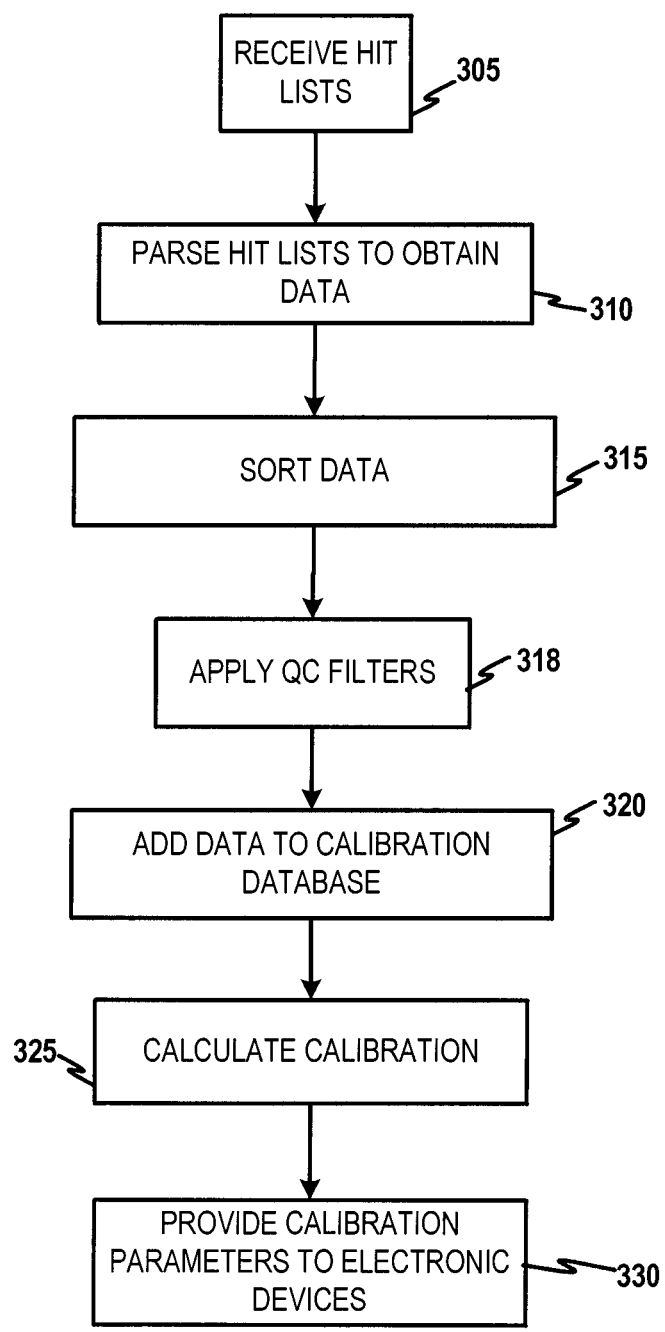
FIG. 3 depicts a flow diagram of a method for obtaining, organizing and using crowd-sourced data for calibrating hardware according to an embodiment.

An "application environment" is an embodiment of programming instructions that direct the various components of each electronic device to execute a plurality of steps, such as those described in more detail in reference to FIGS. 1, 2 and 3. The application environment, when contained in a mobile device, may be referred to as a "mobile application environment." Similarly, the application environment, when contained in a computing device, may be referred to as a "computing application environment." The mobile application environment may be a software application or the like, such as a smartphone "app." The application environment may generally provide a means for using components to sense various environmental factors, sending data, receiving data and calibrating components, as described in greater detail herein. The application environment may further generally provide a means for communicating with other electronic devices, whether or not explicitly described herein, a means for obtaining data, a means for compiling data a means for transmitting data, a means for performing calculations, a means for obtaining calibration information, a means for providing calibration information and a means for completing other tasks, as described in greater detail herein.

A typical calibration may involve exposing a component to one or more known stimuli, measuring the component's response to the one or more stimuli and computing in an appropriate manner. The computing may include computing a conversion between the strength of the component's response and the value that should be displayed in the appropriate unit for an anticipated response, such as, for example, a baseline value. While the calibration of an individual component or a set of individual calibrations of similar components may be extrapolated to an entire class of components, the calibration is ultimately dependent on direct access and testing of a particular component. The present disclosure differs from the typical calibration process described above in a number of ways. First, the calibration may be completed without any direct, controlled access to an individual component. Instead, data may be collected from many examples of the component and remotely delivered to another location for collation and analysis. Second, the calibration may be completed by comparing the various component responses to stimuli. The stimuli may be environmental, uncontrolled in nature, known, approximately known and the like. Third, the collected and collated data obtained from various components may be filtered, sorted, averaged or otherwise statistically analyzed as an ensemble with the resulting calibration applying to all similar components, including any components that may not have been used for the calibration.

FIG. 1 depicts a flow diagram of a method of performing a quality assurance initialization process on an electronic device and/or one or more components thereof according to an embodiment. In some embodiments, the quality assurance initialization process may be completed every time the application environment is used for the first time on the electronic device. In general, the quality assurance initialization process may be completed prior to use of the application.

Initialization may be carried out in an environment that is free or substantially free from type of stimulus to electronic device and/or any components of the electronic device. In some embodiments, for example, the electronic device to be initialized may include a component such as an imager or other device that measures or detects light. Initialization may be carried out in an environment that is free or substantially free from light. In other embodiments, for example, the component may be a device that measures or detects sound. Initialization may be carried out in an environment that is free or substantially free from sound.

In some embodiments, the application environment may direct 105 the user to shield the component and indicate when the shielding has been completed. The application environment may further provide the user with a list of illustrative methods and supplies for properly shielding the component to obtain a correct reading. For example, in some embodiments, the application environment may direct the user to cover an imager or a microphone portion of the electronic device. In some embodiments, the user may have a masking object to be used for properly shielding the component. In some embodiments, it may be necessary or advantageous to place the electronic device or portion of the electronic device (such as one or more components) into an enclosure to obtain proper shielding. The enclosure may have insulation qualities, such as, for example, a container that blocks or excludes radio waves, a container that insulates from thermal radiation and the like, or combinations thereof. In other embodiments, a lens cap, a shutter mechanism and the like, or combinations thereof may be used to shield the component.

The application environment may direct 110 the user to place the electronic device in a stimulus-free area. The stimulus-free area may generally be in an area that allows the processes described herein to be completed without interference or with substantially minimal interference to the electronic device and/or the components. In embodiments in which the component is an imager, initialization may be carried out in an environment that is substantially free from radiation. For example, an environment may be substantially free from radiation if it is exposed to a minimal amount of normal or everyday levels of ambient, background radiation. In such embodiments, the application environment may direct the user to place the electronic device in a radiation-free area and may provide the user with a list of illustrative environments to assist the user in finding a suitable area.

In some embodiments, the application environment may receive an input from the user indicating that the electronic device and/or the component has been shielded and/or that the electronic device has been placed in a stimulus-free area. The input is not limited by this disclosure, and may include, for example, receiving a button input, a keyboard input, a voiced input, a movement-based input, and the like and combinations thereof. In other embodiments, the electronic device may automatically determine that the electronic device and/or the component is been shielded and/or that the electronic device has been placed in a stimulus-free area.

Completion of the shielding as described herein, particularly with respect to the example of an imager, may serve to maximize the application environment's ability to detect radiation by maximizing contrast between sensed areas that contain radiation and sensed areas that do not contain radiation. Completion of the shielding may further minimize confusion that may arise from the application environment's attempts to disentangle differences between sensed areas that contain radiation and sensed areas that do not contain radiation in images containing a large number and/or a complex combination of objects.

In some embodiments, the application environment may obtain 115 information from one or more components during initialization to determine the characteristics of the components. For example, information obtained during initialization may include an imager, a radio antenna, a temperature sensor, an accelerometer, a gyroscope, a proximity sensor, a barometer, a magnetometer, an operating system, firmware, and the like and combinations thereof. Further information may include, for example, a manufacturer of the electronic device and/or each component, a manufacture date, specifications of the electronic device and/or each component, available settings for the electronic device and/or each component, control software for the electronic device and/or each component, maximum and minimum ranges and the like, or combinations thereof. In other embodiments, the application environment may be designed to calibrate the electronic device and/or one or more components without first obtaining any information. In other embodiments, the application environment may operate the electronic device and/or one or more components to collect calibration data in addition to, or instead of, collecting information about the electronic device and/or the one or more components. The collection of such component-specific calibration data may include, but is not limited to, collection of still images, video images, radio-frequency amplitudes, radio frequency phases, temperature, barometric pressure, acoustic data, magnetic field strength, magnetic field direction, magnetic field variability, pH level, position, speed, altitude and the like, or combinations thereof.

The application environment may determine whether the environment surrounding the electronic device and/or one or more components is sufficiently free from stimulus 120. For example, the application environment may scan the component to detect light, audible signals and the like from the component. In some embodiments, the electronic device and/or one or more components may be sufficiently free from stimulus if an average, median, and/or modal value is below a threshold data value. In other embodiments, the electronic device and/or one or more components may be sufficiently free from stimulus if a variance, standard deviation, skew, kurtosis and/or higher data moment is below a threshold. In other embodiments, the electronic device and/or one or more components may be sufficiently free from stimulus if a gradient along one or more axes is below a threshold. In some embodiments, the electronic device and/or one or more components may be sufficiently free from stimulus if the application environment determines that certain data qualities are sufficient. Sufficiency of data quality may include the degree of compliance with pattern-matching for specific types of data distributions, which may include isophote size, morphology, distribution, and the like, or combinations thereof. In some embodiments, sufficiency of data quality may include spatial characteristics of a noise spectrum within the data, and/or temporal characteristics of the noise spectrum within the data. In other embodiments, sufficiency of data quality may include spatial characteristics of the noise spectrum among a range of data taken contemporaneously or over a period of time with some sampling and/or temporal characteristics of the noise spectrum among a range of data taken contemporaneously or over a period of time with some sampling. In some embodiments, the electronic device and/or one or more components may be sufficiently free from stimulus if a received signal strength (amplitude) is below a threshold, phase variations are within a range, or that a noise spectrum fits a particular model. In some embodiments, for example, the noise spectrum may fit a particular model when 1/f noise with a maximum or minimum value is at/below/above a particular frequency value. In other embodiments, for temperature, pressure, or magnetic calibration data calibration, quality assurance criteria may be based upon signal strength, consistency, limits on variability or some required spectral constraints of the signal or the noise. It is important to note that even when the data quality requirements are not met, it may be possible to achieve a threshold for usable data by collecting additional calibration data over some time period during a contiguous or non-contiguous time span.

Alternatively, if the electronic device and/or one or more components is not sufficiently free from stimulus, the application environment may reject 125 the information from the electronic device and/or the component for use in crowd-sourced calibration processes, as described herein. If the electronic device and/or one or more components is sufficiently free from stimulus, the application environment may store 130 the information from the electronic device and/or the one or more components in a remote database. Such calibration data may also be temporarily and/or permanently stored on the electronic device and/or the component either for archival purposes or for local processing of the calibration data. Information regarding the electronic device and/or the component may be assayed from the results of the quality assurance initialization process, specifications of the electronic device and/or the component, manufacturing information regarding the electronic device and/or the component, use of any wireless and/or cellular networks, user information, device identification, component identification, comparison with other devices and/or components to include those that are similar, identical, or wholly different, and the like, and combinations thereof.

The application environment may set 135 one or more thresholds for the device and/or the components that the device is properly set for the crowd-sourced calibration processes. In some embodiments, the one or more thresholds may include, for example, specific data values, such as, for example, counts, temperature, pressure, magnetic flux density, and the like, or combinations thereof. In other embodiments, the one or more thresholds may include dynamically selected thresholds, such as, for example, constant values that are selected at the time the application is run, non-constant or parametric numerical arrays that correspond to some surface or multi-dimensional manifold calculated during application execution and the like, or combinations thereof. In some embodiments, the dynamically selected thresholds may executed at run-time or at a later time via auxiliary applications run on a data-collection server. The quality assessment algorithms previously described herein may also be employed. The application environment may indicate 140 the information from the electronic device and/or one or more components as usable for the crowd-sourced calibration processes and store information about the electronic device and/or the one or more components in a database or similar means for storing and manipulating data and lists of data.

FIG. 2 depicts a flow diagram of a method for obtaining calibration measurements for future use in crowd-sourced data according to an embodiment. While the processes described in FIG. 2 are generally directed toward an imager and/or a non-imaging photon detecting sensor, those skilled in the art will recognize that at least a portion of the processes described herein may be applied to electronic devices as a whole, as well as individual components, such as the components discussed herein. Thus, the description provided herein is not limited to imagers and/or non-imaging photon detecting sensors. The application environment may obtain 205 capture information from the electronic device and/or one or more components. For example, the application environment may obtain an image from imager by, for example, capturing an image with the imager or retrieving an image stored in memory. In other embodiments in which an audio device is calibrated, an audio recording may be created or retrieved from memory. In other embodiments in which positional information is calibrated, positional coordinates, such as a GPS location may be obtained from a GPS sensor.

The mobile application environment may examine 210 individual portions of the capture information, such as, for example, frames within an image, portions of an audio recording and the like to identify 215 local maxima and/or minima. For example, in embodiments in which an imager is calibrated to detect radiation, the application environment may identify local maxima. As each local maximum is identified 215, the application environment may compare 220 the characteristics of the image pixels comprising the local maximum with any pixels substantially surrounding each local maximum. A wide range of suitable maxima-finding algorithms may be used to compare local maxima with the surrounding pixels. For example, a non-limiting way of comparing may include evaluating the four closest pixels (4CP) in digital image data. If the pixel or image data point under consideration is (X,Y), then the 4CP are: (X+1, Y), (X,Y+1), (X−1,Y), and (X,Y−1). The local background value of the imager may be taken as the average of the eight pixels corresponding to (X−2,Y−2), (X,Y−2), (X+2,Y−2), (X−2,Y), (X+2,Y), (X−2,Y+2), (X,Y+2), (X+2,Y+2). Alternatively, if a known reference object is in the field, it may be set to be the background and the average of the pixels or data points corresponding to the object set to the background.

Based on the captured information and/or the comparison, the application environment may determine 225 whether a potential hit exists. For example, if the local maxima that meet or exceed one or more thresholds may be considered areas that include potential hits for radiation emission. In embodiments where radiation is detected, the thresholds may include total counts in the local maximum, total counts summed over the local maximum plus surrounding pixels, an excess of either of the above-described thresholds with respect to a measure of the average counts in pixels away from any local maximum, ratios of such total counts or excesses to the average, standard deviation, and/or other statistical measures of counts in areas away from a local maximum. If a potential hit exists, the application environment may add 230 the potential hit to a list or enter the potential hit in a database and store information regarding the potential hit for further review. Once a potential hit has been added to the potential hit list, the application environment may determine 235 whether additional portions must still be examined, and if so, may examine 210 the additional portions. In some embodiments, the application environment may repeat the process or identify local maxima or minima meeting lower or higher thresholds, where such adjustments to the thresholds may be determined from the information stored from previously detected potential hits.

If no more frames remain, the application environment may assess 240 each potential hit in the hit list with one or more additional quality control (QC) filters. Examples of additional QC filters may include, but are not limited to, limits on the number of potential hits detected on a single frame, limits on the number of potential hits detected on a single pixel and/or on groups of neighboring pixels, limits on the frequency of potential hits detected on a single pixel and/or on groups of neighboring pixels, comparison to thresholds as previously described herein as may have been adjusted according to the information stored regarding all or a portion of the potential hits in the list or other lists, or a location on the component.

The application environment may determine 245, after assessing 240 each potential hit, whether each potential hit is an actual hit. A potential hit may be determined to be an actual hit if it passes some or all of the additional QC filters. If the potential hit is found to not be an actual hit, the application environment may discard 250 the potential hit from a final hit list, and may optionally adapt dynamic parameters that would update thresholds and/or QC filters. If the potential hit is found to be an actual hit, the application environment may add 255 the potential hit to the final hit list and/or enter the actual hit into a database and store the actual hit. In some embodiments, the application environment may also add 255 information relating to the hit to the final hit list. Examples of information relating to the hit for embodiments in which imagers are calibrated may include, but are not limited to, images, coloration of local maxima pixels, coloration of surrounding pixels, the total number of pixels examined, the total number of frames, the detection parameters associated with the maximum or minimum detection, additional QC filter results, the number of hits that passed the additional QC filter, the number of potential hits that did not pass the additional QC filter, information regarding the initialization described in FIG. 1 herein, results obtained from the initialization, information about the electronic device, information about the components, geolocation information, information regarding a user of the electronic device and the like, or combinations thereof. Examples of information relating to the hit for embodiments related to other components may include baseline magnetic readings (e.g., strength and direction), variability of magnetic readings, various statistical moments of magnetic readings, baseline accelerometer readings, variability of accelerometer readings, various statistical moments of accelerometer readings, temperature readings, variability of temperature readings, various statistical moments of temperature readings and the like, or combinations thereof.

In particular embodiments, the application environment may transmit 260 the final hit list to a remote computing device. The method of transmission 260 from the application environment on the electronic device to a remote computing device is not limited by this disclosure, and may include any method of wired or wireless communication.

The application environment described above with reference to FIG. 1 and FIG. 2 may be a mobile application environment or a computing application environment depending on the arrangement of the electronic device and/or the one or more components being calibrated. For example, in some embodiments, the application environment may be a mobile application environment when the programming instructions are carried on, for example, a mobile or smart phone, a mobile image detector, a mobile GPS device, or a mobile audio recorder. In other embodiments, the application environment may be located on an individual standalone component, as described in greater detail herein. In other embodiments, the application environment may be a computing application environment in which the programming instructions are carried on a computer containing or electronically connected to one or more electronic devices and/or components to be calibrated. For example, in some embodiments, one or more imagers may be connected to a computer that is capable of analyzing and storing data gathered by the one or more imagers. In certain embodiments, the computer may obtain image data from a plurality of imagers, and the computing application environment may be capable of analyzing and controlling each imager of the plurality of imagers individually. In certain embodiments, the computer may be a remote server or a local server collecting data from one or more components of one or more different types, such as, for example, imagers, acoustic sensors, magnetometers, GPS sensors, position sensors, radio receivers, non-imaging light sensors, photon-detecting sensors, ionizing radiation sensors, barometers, thermometers, thermal sensors, infrared sensors, pressure sensors, electric field sensors and the like.

FIG. 3 depicts a flow diagram of a method for obtaining, organizing, and using crowd-sourced data for calibrating hardware according to an embodiment. The processes described with respect to FIG. 3 may generally be completed by a computing device, such as a server, a mainframe, supercomputer, or other central computing repository that is capable of communicating with one or more electronic devices and/or one or more components. A computing application environment in the memory of a computing device may direct one or more components of the computing device to receive 305 one or more hit lists from a plurality of electronic devices and/or components. The computing application environment may receive 305 one or more hit lists from any number of electronic devices and/or components. However, those skilled in the art will recognize that the computing application environment may be configured to receive 305 one or more hit lists from a large number of electronic devices and/or components, as a greater number of received 305 hit lists will allow for a more accurate calculation, as described in greater detail herein.

The computing application environment may parse 310 the hit lists to obtain data contained within each hit list. The data may include, but is not limited to, actual hits found by each electronic device in an image, copies of images, coloration of local maxima pixels, coloration of surrounding pixels, the total number of pixels examined, the total number of frames, additional QC filter results, the number of hits that passed the additional QC filter, the number of potential hits that did not pass the additional QC filter, information regarding the initialization process described in FIG. 1 including results obtained from the initialization process, information about the electronic device, information about the components, geolocation information, magnetometer-obtained information, audio information, motion-related information, barometric reading information, electrical field information, information regarding a user of the electronic device, other non-image types of data, metadata, associated information described herein and the like, or combinations thereof. The computing application environment may further sort 315 the data as it is received from each electronic device. Sorting 315 may, for example, group similar devices or components together, group similar results together, and the like and combinations thereof.

In some embodiments, the application environment may apply 318 one or more QC filters. Examples of QC filters may include, but are not limited to, comparison of some or all of the data described herein for a hit list with hit lists for other electronic devices and/or components, and comparison of some or all of the data with global criteria such as, but not limited to, total frequency of hits, examined area, and/or geographical region. Data failing QC filters may be marked as such and/or may be removed from further calibration consideration.

In some embodiments, the computing application environment may add 320 the data to a calibration database. The calibration database may be stored in a memory within the computing device or memory in operable communication with the computing device. The communication may be continuous, periodic, sporadic, or only once following the data collection. The database may be searchable and readable by the computing application environment for future access. The database may further be edited at any time by the computing application environment to ensure that it contains accurate data that is received from each electronic device.

The computing application environment may calculate 325 calibration for each electronic device, each component, each group of electronic devices, each group of components and the like, or combinations thereof. In some embodiments, electronic devices and/or components may be grouped by manufacturer. In other embodiments, electronic devices and/or components may be grouped by model name, manufacturer, serial number, part number, lot number and the like, or combinations thereof. In certain embodiments, electronic devices may be grouped by individual component specification. In some embodiments, electronic devices may be grouped by type of device. In still other embodiments, electronic devices may be grouped by the geographical region, altitude, or time period in which the electronic device and/or component is used.

The calculation 325 may generally include any calculations now known or later discovered for calibration purposes. In embodiments in which radiation is detected, the calculations may involve making the following assumptions: (1) all detected hits arise from environmental sources of radiation; (2) the dose rate is universal, on average, over the areas from which data has been received; (3) the worldwide average gamma ray dose rate is 0.07 nSv/hr; (4) Poisson statistics are appropriate; (5) the camera package is the same for all devices of a given model, including the physical detector, its electronics, associated controllers, and both firmware and software; (6) as a consequence of the previous assumption, the gain and exposure settings are also constant in time and over all examined devices; and (7) the frames are effectively black and have no noise sources, other than hot pixels that can contribute hits. In other embodiments in which radiation is detected, the calculations may combine geographical location with databases that correlate location with known background radiation rate at those locations in order to provide an improved calibration for the device. Similarly, magnetic sensors may make use of correlated geolocation and geomagnetic field vector, temperature sensors may make use of weather data to achieve enhanced results, and barometers and pressure sensors can combine location, altitude, and known barometric pressure to achieve improved calibration results.

In some embodiments, the calculation 325 may include the following paragraphs and equations. A first step may involve assuming Poisson statistics. If an underlying detection rate is $\mu$ hits per pixel, then the probability of detecting N hits in p pixels is:

$$P(N \mid \mu, p, I) = \frac{(\mu p)^N e^{-\mu p}}{N!} \quad (1)$$

where the symbol I indicates the background information and assumptions discussed herein. The problem may be inverted and the probability distribution for $\mu$ given the observed values of N and p may be inferred. Applying Bayes' theorem:

$$P(\mu \mid N, p, I) = \frac{P(N \mid \mu, p, I)P(\mu \mid I)}{P(N \mid I)} \quad (2)$$

where the area p is well known and independent of the other factors. For the prior, i.e., the second factor in the numerator, the hit rate $\mu$ is a scale factor, and therefore the Jeffreys' prior is appropriate, with $\mu \geq 0$. The denominator in Eq. 2 is a normalizing factor and is fixed by the requirement that the total probability is one. For the purposes of the present application, only data sets where N>>1 will be followed. In this limit, the posterior probability on $\mu$ is:

$$P(\mu \mid N, p, I) = \frac{p(\mu p)^{N-1} e^{-\mu p}}{(N-1)!} \quad (3)$$

This distribution has moments:

$$m_i = \frac{(N+i-1)!}{p^i (N-1)!} \quad (4)$$

and thus the expectation values for the mean and standard deviation are given by:

$$\langle \mu \rangle = m_1 = N/p,$$

$$\sigma_\mu = \sqrt{m_2 - m_1^2} = \sqrt{N/p} \quad (5)$$

respectively. Assuming now the average dose rate, R, and that N is large, the calibration factor, C, can be estimated. Given the large intrinsic uncertainties in the dose rate as discussed herein, the statistical uncertainty in C from measurements will be quoted. The true uncertainty is likely larger, especially when combining results from many devices in many diverse locations on the assumption of a single dose rate. On the other hand, averaging over many such diverse locations may prove consistent with the averaging used in defining R, and thus the uncertainty reduced. Ignoring then the unknown uncertainty in R, the calibration factor and its uncertainty will be given by:

$$C = \frac{R}{\langle \mu \rangle},$$

$$\sigma'_C = C \langle \mu \rangle^{-\frac{1}{2}} \quad (6)$$

As previously described, the calculation 325 may be improved by receiving 305 additional hit lists from additional electronic devices. Improving the calculation 325 may ensure the creation of more accurate calibration parameters, as discussed herein.

In some embodiments, the calculation 325 may allow the computing application environment to create one or more parameters for each electronic device and/or each component. The one or more parameters may be used to adjust settings on each electronic device to ensure measurements are consistent across all electronic devices and/or components in a group. The computing application environment may provide 330 the one or more parameters to one or more electronic devices and/or components, and may further provide instructions for adjusting each electronic device and/or component according to the one or more parameters. The parameters may provide more accurate calibration for each individual electronic device and/or component as the computing application environment receives 305 additional hit lists from additional electronic devices and/or components and calculates 325 the calibration from the additional hit lists.

Figure 4:
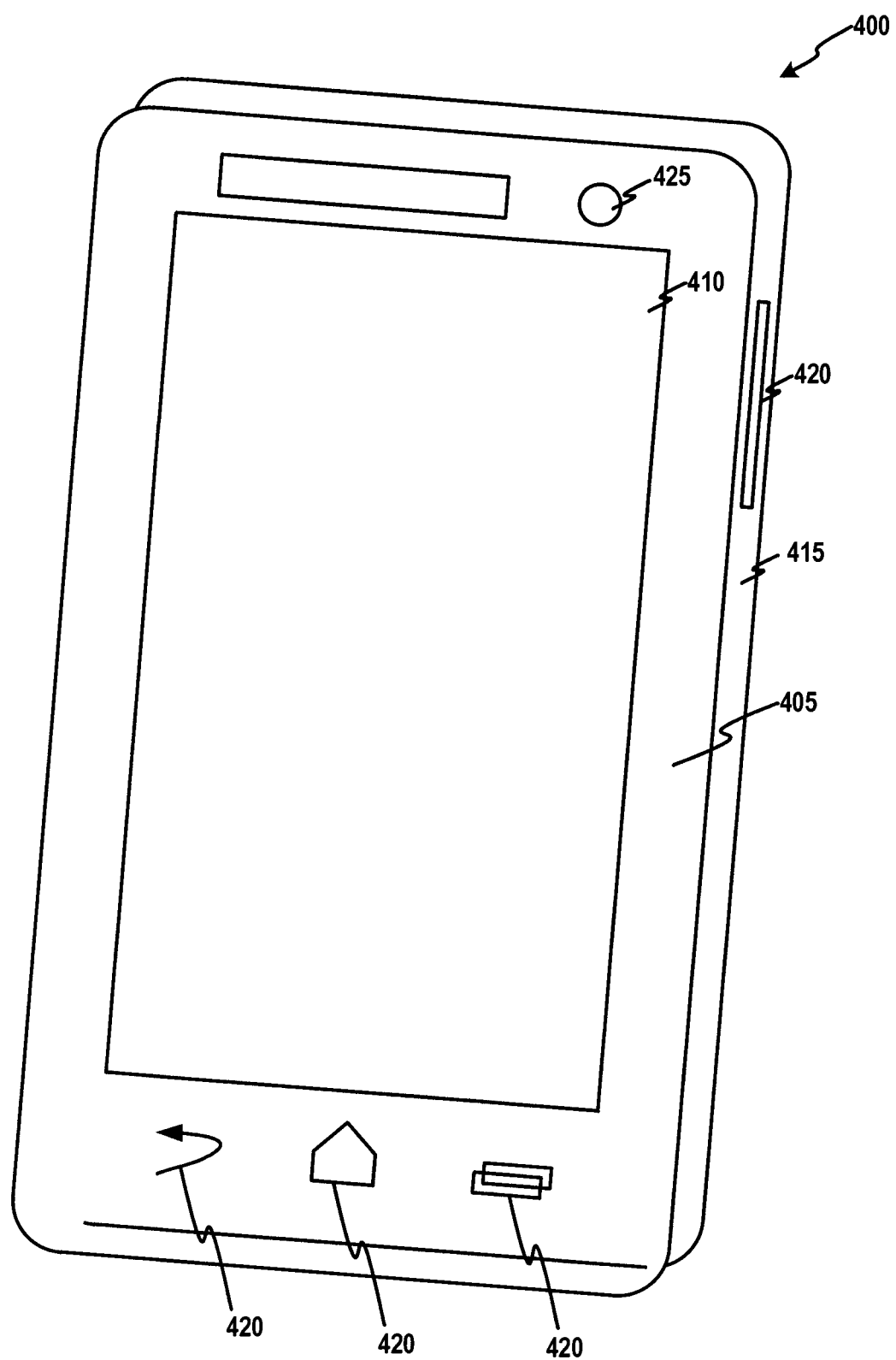
FIG. 4 depicts a perspective view of a first and second face of a device according to an embodiment.

FIG. 4 depicts a perspective view of a mobile device, generally designated 400, according to an embodiment. The mobile device described herein may generally refer to a smartphone and the like, or components thereof. The mobile device may have a first face 405 and a second face 415. The first face 405 may have a display 410. The display 410 may generally be a component for displaying images, text, video and the like. Examples of displays may include, but are not limited to, electroluminescent displays, electronic paper displays, vacuum fluorescent displays, light emitting diode (LED) displays, cathode ray tube (CRT) displays, liquid crystal (LCD) displays, plasma display panels, digital light processing (DLP) displays, and organic light-emitting diode (OLED) displays.

The mobile device 400 may further have one or more user interface components 420, which may be positioned on any face of the device. The one or more user interface components 420 may generally be configured to elicit one or more commands to the mobile device 400 when actuated. Examples of user interface components 420 may include keypads, switches, microphones, buttons, dials, and the like, and combinations thereof.

As an alternative to, or in conjunction with the one or more user interface components 420, the display 410 may further include a touch sensitive screen, wherein the touch sensitive screen may act as a user interface component. The touch sensitive screen may receive contact based inputs from a user, such as from a user's fingers, a stylus and the like, or combinations thereof. The touch sensitive screen may be adapted for gesture control, thus allowing for a user to tap, pinch, swipe or provide other similar gestures to elicit commands to the mobile device 400. The touch sensitive screen may further be capable of sending touch commands to the processing device. Examples of touch sensitive screens may include, but are not limited to, resistive touchscreens, capacitive touchscreens, infrared touchscreens and/or other technologies now known or later developed. The mobile device 400 may also be adapted to receive commands via body gestures, voice, audio signals, device movement and the like, or combinations thereof (e.g., using an imager 425).

Figure 5:
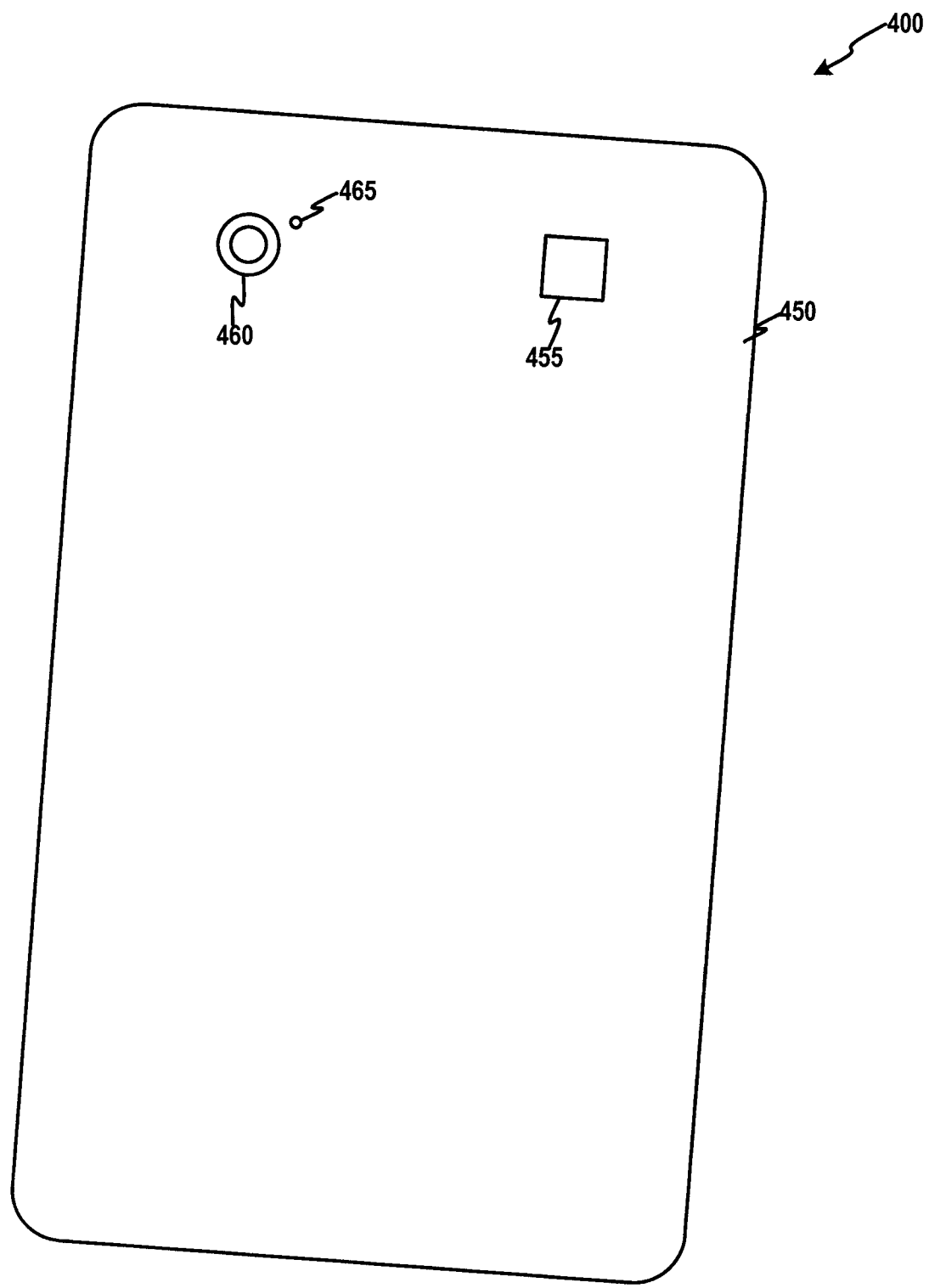
FIG. 5 depicts a perspective view of a third face of the device in FIG. 1 according to an embodiment.

In particular non-limiting embodiments, the application environment as described with regard to FIG. 1 and FIG. 2 may be carried on a mobile electronic device such as a smart phone. FIG. 5 depicts a perspective view of a third face 450 of the mobile device 400, according to an embodiment. The third face 450 may generally have an imager 460. The third face 450 may also optionally have an audio component 455 and/or an illumination component 465.

The imager 460 may be any suitable component capable of receiving an optical image and transmitting image information to other components of the mobile device 400 for processing, such as, for example, a camera. The imager 460 may further have an ability to adjust its focal length and aperture in such a manner that would allow it to zoom and properly focus upon an intended object to be imaged. Such ability may be through mechanical components (such as an optical zoom) or programming (such as a digital zoom). This adjustment may define an "optimal focal distance," or a range of distances in which the mobile device 400 may be properly positioned from the intended object to be imaged to achieve a clear image.

While the imager 460 is depicted on the rear face of the present example, persons skilled in the art will appreciate that the imager 460 may be positioned at any location on or in any face of the mobile device 400, or may even be external to the mobile device 400 and connected by any means of communication, including, but not limited to, physical cable communication such as universal serial bus (USB), wireless radio communication, wireless light communication, or near field communication technology. The imager may also be internal to the device 400 with or without a moveable portal such that the imager may only image the inside of the device 400. In other embodiments, the imager may be replaced with or augmented by a non-imaging photon-sensitive device, such as, for example a photo-diode, Geiger-Muller tube, a photocathode tube, and the like, or combinations thereof.

The imager 460 may further be configured to receive an optical image on the display of another mobile device, such as, for example, a symbology displayed on the display of the other mobile device, as described in greater detail herein.

The optional illumination component 465 may be utilized in any light conditions to assist the imager 460 in completing any of the tasks described herein. Additionally, the illumination component 465 may be independently activated to turn on or off at specific points in time, such as when additional lighting is necessary to capture an ideal image. Other features of the illumination component 465 may include dimming, strobe, constant on and the like, or combinations thereof.

The illumination component 465 may contain any suitable light source capable of providing illumination, including, but not limited to, magnesium-based flashes, xenon-based flashes, fulminate-containing flashes, light-emitting diode (LED) flashes and the like. While the present figure depicts the illumination component 465 as being integrated with the mobile device 400, it may be appreciated that the illumination component may be a separate component in communication with the mobile device, such as USB based flashes, hot shoe based flashes, remote slave flash units, or other similar devices.

An audio component 455 may be adapted to emit audio tones and signals. Such audio tones and signals may be used to instruct the user to complete various steps as described herein, and may further indicate to the user that an image has been received by the imager 460 by emitting a beep, click, or other audio signal. Additionally, the audio component 455 may be adapted to receive audio signals. Such audio signals may include, for example, voice commands from a user. Moreover, the audio component may be used to generate calibration signals for an audio receiver in certain embodiments to calibrate acoustic sensitivity or responsiveness.

Figure 6:
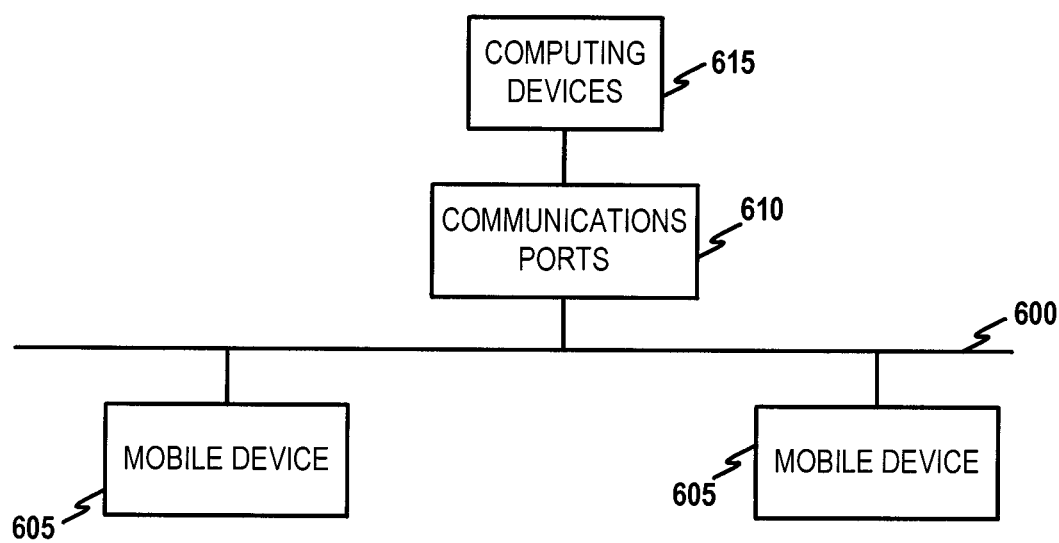
FIG. 6 depicts a block diagram of illustrative communications between one or more electronic devices and one or more computing devices according to an embodiment.

The mobile device 400 may further have an ability to connect to a communications network, as described in FIG. 6 herein. The types of communications networks that may be used in accordance with this disclosure are not limited in any manner, and may include any communications network now known or later developed. For example a communications networks may include, but is not limited to, the Internet, an intranet, a wide area network (WAN), a local area network (LAN), a wireless local area network (WLAN), a storage area network (SAN) and the like, or combinations thereof. In some embodiments, the network may not be constantly available and may further include non-standard architecture. Examples of non-standard architecture may include, but is not limited to, disruption-tolerant networks, for networks, networks that include a mixture of physical and logical components, such as, for example, radio links, cable links, fiber links, one-way links, or the like, and combinations thereof.

The configuration of the mobile device 400 as shown in FIGS. 4 and 5 is merely an example of a mobile device, and persons skilled in the art will appreciate that other configurations and embodiments will be possible without departing from the scope of this disclosure.

FIG. 6 depicts a block diagram of communications between one or more electronic devices and one or more computing devices. A communications network 600 may interconnect the other illustrated components. The communications network is not limited by this disclosure and may include any communications network now known or later developed. Examples of communications networks may include, but are not limited to, the Internet, intranets, wired networks, ad hoc networks, wireless networks, Wi-Fi networks, and the like and combinations thereof. One or more electronic devices 605, such as mobile devices, computing devices and the like may connect to the communications network 600. In embodiments where more than one electronic devices 605 are connected to the communications network 600, each electronic device 605 may be configured to communicate with other electronic devices via the communications network 600. One or more computing devices 615 may also be connected to the communications network 600 and may optionally connect through the use of one or more communications ports 610.

Figure 7:
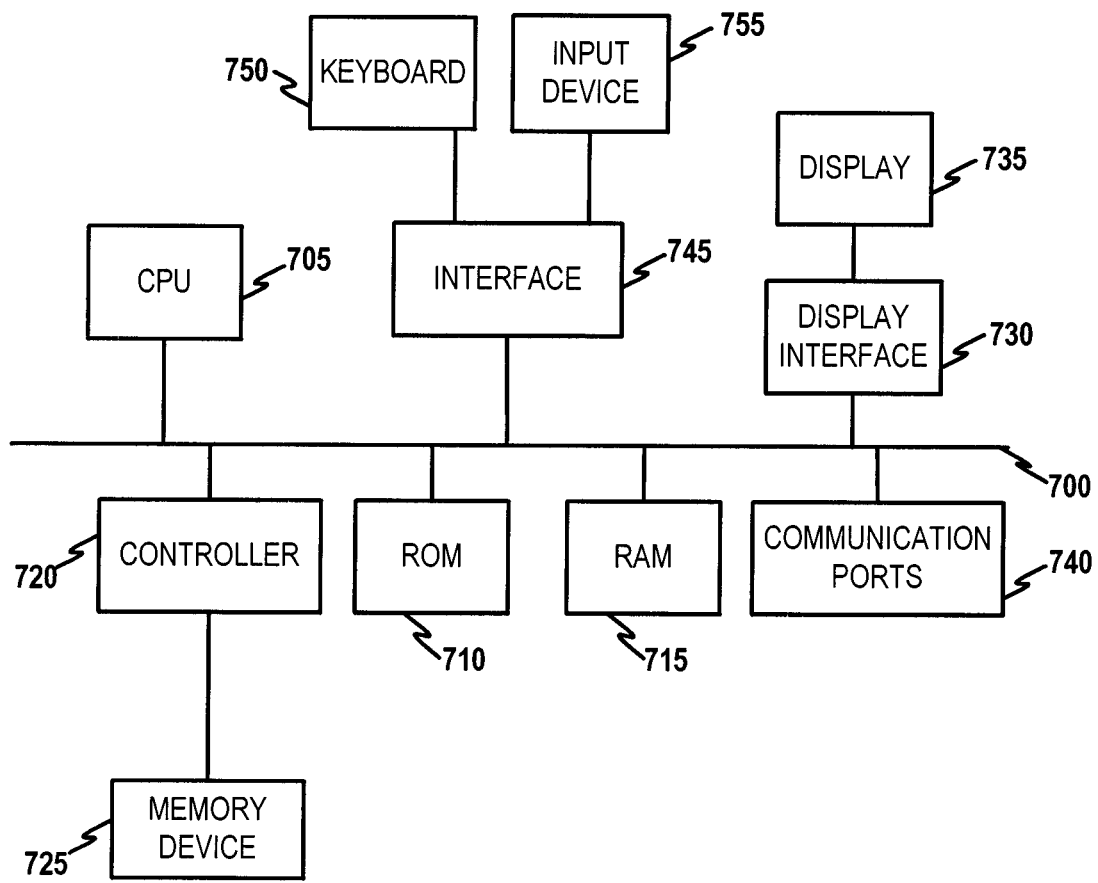
FIG. 7 depicts a block diagram of illustrative internal hardware that may be used to contain or implement program instructions according to an embodiment.

FIG. 7 depicts a block diagram of illustrative internal hardware that may be used to contain or implement program instructions, such as the process steps discussed herein in reference to FIGS. 3-5, according to embodiments. A bus 700 serves as the main information pathway interconnecting the other illustrated components of the hardware. CPU 705 is the central processing unit of the system, performing calculations and logic operations required to execute a program. CPU 705, alone or in conjunction with one or more of the other elements disclosed in FIG. 7, is an illustrative processing device, computing device or processor as such terms are used within this disclosure, which may include, for example a programmable digital signal processor (DSP), a graphics processing unit (GPU), and/or a field-programmable gate array (FPGA). Read only memory (ROM) 710 and random access memory (RAM) 715 constitute illustrative memory devices (i.e., processor-readable non-transitory storage media). A controller 720 interfaces with one or more optional memory devices 725 to the system bus 700. These memory devices 725 may include, for example, an external or internal DVD drive, a CD-ROM drive, a hard drive, flash memory, a USB drive or the like. As indicated previously, these various drives and controllers are optional devices.

Program instructions, software or interactive modules for providing the interface and performing any querying or analysis associated with one or more data sets may be stored in the ROM 710, the RAM 715, a programmable digital signal processor (DSP), a graphics processing unit (GPU), and/or a field-programmable gate array (FPGA). In some embodiments, the program instructions may be stored on a tangible computer readable medium such as a compact disk, a digital disk, flash memory, a memory card, a USB drive, an optical disc storage medium, such as a Blu-Ray™ disc, and/or other non-transitory storage media.

In some embodiments, a display interface 730 may permit information from the bus 700 to be displayed on the display 735 in audio, visual, graphic, or alphanumeric format. In some embodiments, the display interface 730 may incorporate a graphics processing unit (GPU) or the like. Communication with external devices, such as a print device, may occur using various communication ports 740. An illustrative communication port 740 may be attached to a communications network, such as the Internet or an intranet. Hardware may also include an interface 745 which allows for receipt of data from input devices such as a keyboard 750 or other input device 755 such as a mouse, a joystick, a touch screen, a remote control, a pointing device, a video input device and/or an audio input device.

The various embodiments may be realized in the specific examples found below.

Example 1

Calibration of an Imager

In an example of an imager such as a security camera, a traffic camera, a smartphone camera or a handheld camera, a sensor, such as a CCD or CMOS sensor, may receive radiation signals from nearby object(s), such as an ambient radiation field present at or near the imager. One or more CCD or CMOS sensors may be used to sample a region or objects in the environment to determine if radioactive materials are present and/or to sense the ambient radiation that is present. An image from each of the cameras may have the charge at each pixel determined using the imager's hardware to detect pixels with high charge caused by photoelectrons generate by gamma rays. Alternatively, the image may be analyzed using software or firmware from the camera or a central processor connected to the camera to detect gamma-ray artifacts. The data signature of a gamma ray may include one or more pixels having high charge or brightness above a background or threshold level. The charge, brightness and frequency of the pixels struck by the gamma rays emitted from a source or radioactive material is expected to be greater than the charge or brightness for the same pixels interacting with ambient light. The frequency of the pixels struck by the gamma rays emitted from a source or radioactive material is expected to be greater than the frequency for the same pixels interacting with just background radiation levels.

Software may be used to evaluate the images from an imager and conduct a series of steps to reduce/eliminate false-positive alerts. These steps may include acquiring additional images, calibrating the detector, comparison of the image and detected high energy particles with images from other nearby cameras, comparing the counts to a threshold, comparison of the identity of the energy of the gamma rays detected with a library of known radioactive isotopes to determine if a match is possible, assembling multiple images at multiple epochs to determine which visual objects are correlated with the appearance of excess radiation, assembling multiple images at one or more epochs to determine if the measured radiation field is changing in time and therefore possibly correlated with a moving object, or any combination of these acts.

Information regarding the image, as well as information regarding the imager (i.e., manufacturing components, date of manufacture, location of the imager, time and date image was captured, and software settings) may be sent to a server for use in cataloging and calculating standardized calibration settings. The server may receive information from a large number of imagers (i.e., hundreds or more), as well as information from a wide variety of imagers (i.e., different manufacturers, different models, different software, different specifications and different manufacturing dates) and may catalog the information based on certain similarities (i.e., each make/model device grouped together). Using an algorithm, the server may calculate ideal settings and create settings parameters for each make and model, based on the crowd sourced information received. Additionally, the server may modify the ideal settings and settings parameters as needed when additional information is received from additional devices. The server may then push the settings parameters out to the respective devices so that they may be accurately calibrated for future use.

Example 2

Experimental Data

To validate this technique, a first data set is a series of 208 measurements taken with a particular HTC Desire, "Camera 11" in a data set. This specific device had been previously calibrated with data taken at a primary calibration site, i.e., it was physically at that lab for testing. At that time, the camera was exposed to radiation fields of 300, 700, and 5000 µSv/h. The results are given in Table I. The three data sets from this primary calibrator are in good agreement, indicating linearity in the device's response. The final line is a new tertiary, or crowd-sourced, calibration based on 208 measurements taken at an interior, second-floor location in western Massachusetts, at approximately 500 feet above sea level. The calibration factor derived from the tertiary or crowd-sourced calibration procedure agrees well with the primary calibration.

There are 22 additional devices identifying themselves as HTC Desires. Of these, two have sufficient data to permit independent estimates of the calibration. The results are given in Table II. The user of Device 2982 has evidently taken advantage of an option to take longer measurements for each observing instance so as to accumulate so much area in his 38 measurements. The calibration from this device is in good agreement with that for Device 11. The number of hits detected on Device 406, on the other hand, give a low-precision calibration, as does the combined results of the other 20 HTC Desires. Combining all the data for this phone model gives a final calibration factor with a 10% statistical uncertainty.

A second example is for a set of Fujitsu F-05D phones. This is the Fujitsu Arrows X LTE as marketed by NTT Docomo in Japan. All observations appear to have been taken in Japan. There are six devices with 20 or more measurements, and a further 101 phones with an average of three measurements each. The results for this model are given in Table III. Of the six phones, three have too few hits to provide good precision, while the other three are better data sets and are in good agreement. Combined, these six give a calibration factor of 0.18±0.03 µSv Gpix h$^{-1}$. The other 101 devices when combined, give a similar result, C=0.24±0.03 µSv Gpix h$^{-1}$. When combined, the results indicate that this Fujitsu device has about the same sensitivity as the HTC Desire.

A final example is for the Samsung Galaxy S II. While there are no individual phones of this model with as many observations as for the two discussed above, the variations in naming convention between mobile phone service providers means that there are two independent samples for what are possibly two variants of the phone in different markets. This allows for checking on the consistency of the calibration factor over a product line. For both data sets, the calibration factors are in excellent agreement.

The results presented in the previous section are very encouraging. When work commenced, there were two main concerns, that intrinsic variations between phones and the natural variability in the environmental gamma-ray dose rate would defeat an attempt to complete a tertiary calibration. The good consistency in the measured calibration factors suggest that these issues will not prevent tertiary calibrations from being completed with relatively good precision.

This result has some interesting implications. In any case, where many observations are combined, a reliance on the law of large numbers is needed to give a sound result, irrespective of the individual data points involved. However, this approach will not work well if there are multiple populations among the data being sampled, as expressed by the concerns mentioned herein. In particular, the wide geographic distribution of the readings provides a sampling of the background radiation level over that same geographic range. That it comes to have the same average value is then not a surprise. It is possible that intra-model differences among phones and the radiation background may conspire to give the appearance of consistency, but this would require an anti-correlation that there is no prima facie reason to expect. The case of the two sets of Samsung devices in Table IV is a case in point. As previously mentioned herein, alternative approaches combine known geographic-linked background radiation level data with the mobile device's location to provide the basis for an enhanced calibration procedure.

Crowd-sourcing of data generates large data sets to allow for real-time monitoring and historical analysis. In some circumstances, the uncontrolled nature of this data may limit its use. When a relevant calibration reference is available, this data can be made even more valuable by auto-calibrating it in the manner described here.

TABLE I

RESULTS FOR DEVICE 11, AN HTC DESIRE

| Dose rate (µSv/h) | Area examined (Gpix) | Hits counted | C (µSv Gpix/h) | $\sigma$C |
|---|---|---|---|---|
| 5000* | 1.8 | 27459 | 0.328 | 0.002 |
| 700* | 1.8 | 3959 | 0.318 | 0.005 |
| 300* | 3.6 | 3420 | 0.316 | 0.005 |
| 0.08 | 148. | 54 | 0.19 | 0.03 |

*Data taken at a primary calibration site

TABLE II

TERTIARY CALIBRATION RESULTS FOR HTC DESIRE

| Device | Number of Runs | Area examined (Gpix) | Hits counted | C (µSv Gpix/h) | $\sigma$C |
|---|---|---|---|---|---|
| 11 | 208 | 148. | 54 | 0.19 | 0.03 |
| 2982 | 38 | 121. | 37 | 0.23 | 0.04 |
| 406 | 31 | 25.5 | 5 | 0.36 | 0.16 |
| 20 Others | 60 | 37.8 | 10 | 0.27 | 0.08 |
| All | 337 | 332. | 106 | 0.22 | 0.02 |

TABLE III

TERTIARY CALIBRATION RESULTS FOR FUJITSU ARROWS X LTE

| Device | Number of Runs | Area examined (Gpix) | Hits counted | C (µSv Gpix/h) | $\sigma$C |
|---|---|---|---|---|---|
| 1584 | 46 | 28.8 | 13 | 0.16 | 0.04 |
| 4387 | 30 | 18.8 | 9 | 0.15 | 0.05 |
| 3409 | 20 | 15.5 | 4 | 0.27 | 0.14 |
| 3312 | 24 | 15.0 | 9 | 0.12 | 0.04 |
| 4082 | 23 | 14.5 | 4 | 0.25 | 0.13 |
| 3387 | 20 | 12.5 | 3 | 0.29 | 0.17 |
| 6 above | 163 | 105. | 42 | 0.18 | 0.03 |
| 101 Others | 302 | 195. | 57 | 0.24 | 0.03 |
| All | 465 | 300. | 99 | 0.21 | 0.02 |

TABLE IV

Comparison of results for Samsung Galaxy S II

| Market | Number of Devices | Number of Runs | Area examined (Gpix) | Hits counted | C (μSv Gpix/h) | σ°C |
|---|---|---|---|---|---|---|
| Japan | 197 | 512 | 331. | 38 | 0.61 | 0.10 |
| Non-Japan | 110 | 281 | 180. | 23 | 0.55 | 0.11 |

Example 3

Use of a Microphone to Detect Sound

An electronic device has one or more microphones that are used to detect sounds in the environment of the electronic device. It is desired to have a calibration of the frequency and/or amplitude response of the one or more microphones. The microphone is exposed to sounds containing known frequencies and/or amplitudes, such as, for example, an identifiable song or melody for which a reference version is available. The measured response of the microphone can be compared to the known reference to measure the microphone's response in terms of signal amplitude and/or frequency.

Example 4

Calibration of an Accelerometer

The integrated acceleration of an object, as measured by an accelerometer, is compared with the measured position and velocity, such as, for example, from a GPS sensor. When, for example, the motion is known to be externally constrained to a particular route, such as, for example, travel along a known road, the measured position and velocity serve as corroborating data for comparison with accelerometer readings and to act to calibrate the latter.

Example 5

Calibration of Position Measurements

As explained in the previous example, a motion of an object may be known to be constrained to travel along a known route. The measured velocities and/or positions of the object from, for example, a GPS sensor, may then be compared with the expected changes. Examples of expected changes may include turns at known curves in the road. The constraints provided by the expected changes may serve to calibrate the response of the position sensor.

Example 6

Calibration of a Magnetometer

A magnetometer is used to measure one or more components of a magnetic field, such as, for example magnetic field strength and magnetic field direction. The measurements from the magnetometer may then be compared with a position, a direction and/or a velocity measurement from, for example, a GPS sensor. Where the position, direction and/or velocity is known to be constrained to be along a known route in a particular direction, and where the correction between the true direction towards north or south and the direction of magnetic north or south are known for that location, then the comparison of the detected magnetic field with that expected for that location may be thus used to calibrate the magnetometer.

Example 7

Calibration of Traffic Cameras

In addition to being used for determining the location of accidents, catching drivers who run through red lights and the like, traffic cameras may also be used to measure the velocity of traffic. Video from the traffic cameras of a known altitude above a roadway and a known viewing angle is collected. The positions of cars may be measured, as well as their apparent average speed, which is determined with a series of calculations involving the amount of time a car is observed to cross two known and measured points, the frame rate of the camera and other factors. The data from the traffic cameras is sent to a remote computing device, which also obtains data from radar guns that measure the speed of the same vehicles on the same stretch of road at the same time. The remote computing device then determines whether the data obtained from the traffic cameras matches the data obtained from the radar guns and sends instructions to the traffic cameras and/or the radar guns to adjust accordingly, if necessary.

Various of the above-disclosed and other features and functions, or alternatives thereof, may be combined into many other different systems or applications. Various presently unforeseen or unanticipated alternatives, modifications, variations or improvements therein may be subsequently made by those skilled in the art, each of which is also intended to be encompassed by the disclosed embodiments.

What is claimed is:

1. A method for calibrating a mobile device, the method comprising:
    obtaining, by a processor over a wireless network, data from a plurality of reference mobile devices, wherein the data is acquired from at least one similar component in the plurality of reference mobile devices, wherein at least a portion of the plurality of reference mobile devices were initialized in an area substantially free of radiation which the at least one similar component is configured to detect, wherein the radiation comprises one or more of ionizing radiation, gamma radiation, thermal radiation, electric fields, light, and radio waves;
    analyzing, by a processor, the data; and
    calibrating, by the processor, the performance of the at least one component of the mobile device based on the analyzed data obtained from the plurality of reference mobile devices wherein the at least one component of the mobile device is similar to the at least one similar component of the reference mobile devices, based on each of the at least one component and the at least one similar component producing measureable data in response to detection of the same classification of radiation.

2. The method of claim 1, wherein calibrating is carried out on all of the plurality of reference mobile devices.

3. The method of claim 1, wherein calibrating the at least one component of the mobile device comprises calibrating the at least one component_for radiation detection.

4. The method of claim 1, wherein calibrating the at least one component of the mobile device comprises calibrating the at least one component for thermal sensing.

5. The method of claim 1, wherein calibrating the at least one component of the mobile device comprises calibrating the at least one component for pressure sensing.

6. The method of claim 1, wherein calibrating the at least one component of the mobile device comprises calibrating the at least one component for magnetic sensing.

7. The method of claim 1, wherein calibrating the at least one component of the mobile device comprises calibrating the at least one component for electric field sensing.

8. The method of claim 1, wherein calibrating the at least one component of the mobile device comprises calibrating the at least one component for receiving one or more radio frequencies.

9. The method of claim 1, wherein calibrating the at least one component of the mobile device comprises calibrating the at least one component for transmitting one or more radio frequencies.

10. The method of claim 1, wherein the at least one component comprises a microphone; and
    wherein calibrating the at least one component comprises calibrating the at least one component for receiving one or more acoustic frequencies.

11. The method of claim 1, wherein the at least one component comprises a speaker; and
    wherein calibrating the at least one component comprises calibrating the at least one component for transmitting one or more acoustic frequencies.

12. The method of claim 1, wherein the at least one component comprises an accelerometer; and
    wherein calibrating the at least one component comprises calibrating the at least one component for acceleration sensing.

13. The method of claim 1, wherein the at least one component comprises an accelerometer; and
    wherein calibrating the at least one component comprises calibrating the at least one component for gravitational sensing.

14. The method of claim 1, wherein the at least one component comprises an accelerometer; and
    wherein calibrating the at least one component comprises calibrating the at least one component for motion sensing.

15. The method of claim 1, wherein the at least one component comprises one or more global positioning system transceivers; and
    wherein calibrating the at least one component comprises calibrating the at least one component for positional sensing.

16. The method of claim 1, wherein the mobile device comprises one or more imagers.

17. The method of claim 16, wherein the one or more imagers comprise one or more infrared imagers.

18. The method of claim 1, wherein the mobile device comprises a non-imaging, photon-detecting sensor.

19. The method of claim 18, wherein the non-imaging, photon detecting sensor is a photo-diode.

20. The method of claim 1, wherein the mobile device comprises one or more capacitive screen controllers.

21. A system for calibrating a mobile device, the system comprising:
    a processor; and
    a non-transitory, processor-readable storage medium in communication with the processor, wherein the non-transitory, processor-readable storage medium contains one or more programming instructions that, when executed, cause the processor to:
        obtain, over a wireless network, data from a plurality of reference mobile devices, wherein the data is acquired from at least one similar component in the plurality of reference mobile devices, wherein at least a portion of the plurality of reference mobile devices were initialized in an area substantially free of radiation which the at least one similar component is configured to detect, wherein the radiation comprises one or more of ionizing radiation, gamma radiation, thermal radiation, electric fields, light, and radio waves;
        analyze the data; and
        calibrate the performance of the at least one component of the mobile device based on the analyzed data obtained from the plurality of reference mobile devices wherein the at least one component of the mobile device is similar to the at least one similar component of the reference mobile devices, based on each of the at least one component and the at least one similar component producing measureable data in response to detection of the same classification of radiation.

22. The system of claim 21, wherein the one or more programming instructions that, when executed, cause the processor to calibrate the at least one component of the mobile device based on the analyzed data obtained from the plurality of reference mobile devices further comprises one or more programming instructions that, when executed, cause the processor to calibrate at least one component of all of the plurality of reference mobile devices.

23. The system of claim 21, wherein each of the plurality of reference mobile devices comprises one or more of an imager, a non-imaging photon-detecting sensor, a thermal sensor, a pressure sensor, a magnetic sensor, a radio frequency receiver, a radio frequency transceiver, an accelerometer, a gyroscope, a proximity sensor, a position sensor, a global positioning system transceiver, a capacitive screen controller, and an electric field sensor.

* * * * *